ly Switch ISDN Basic Rate Interface Specification (5E4 Generic Program), 1985, pp. i, ii, IV-1 through IV-63.
"ISDN User-Network Interface-Network Layer Specification for Supplementary Voice Services," AT&T 5ESS Switch ISDN Basic Rate Interface Specification (5E4 Generic Program), 1985, pp. i through v, V-1 through V-204.
"ISDN User-Network Interface-Network Layer Specification for Supplementary Voice Services", AT&T 5ESS TM Switch ISDN Basic Rate Interface Specification (5E4 Generic Program), 1985, pp. V-1, V-2, V-46, V-47, V-94 through V-101.

Primary Examiner—James L. Dwyer
Attorney, Agent, or Firm—Ross T. Watland

United States Patent [19]
Wuthnow

[11] Patent Number: 4,893,336
[45] Date of Patent: Jan. 9, 1990

[54] CALL FORWARDING ARRANGEMENT
[75] Inventor: Mark S. Wuthnow, Hazlet, N.J.
[73] Assignee: American Telephone and Telegraph Company, AT&T Bell Laboratories, Murray Hill, N.J.
[21] Appl. No.: 134,649
[22] Filed: Dec. 17, 1987
[51] Int. Cl.$^4$ .............................................. H04M 3/54
[52] U.S. Cl. .................................. 379/211; 379/210; 379/375; 379/164
[58] Field of Search ............... 379/201, 210, 211, 212, 379/213, 373, 374, 375, 156, 157, 158, 159, 160, 164, 165, 166

[56] References Cited
U.S. PATENT DOCUMENTS

| 4,278,844 | 7/1981 | Jones | 379/157 |
| 4,567,333 | 1/1986 | Embree et al. | 379/375 |
| 4,646,347 | 2/1987 | Liu | 379/375 |

FOREIGN PATENT DOCUMENTS
0216381 4/1987 European Pat. Off. .
1043839 9/1966 United Kingdom .

OTHER PUBLICATIONS
D. L. Huebner, "Intelligent Telephones and Generic Switching: A Distributed Processing PABX Architecture", GTE ISS '84, Florence, 7-11 May 1984.
"ISDN User-Network Interface Network Layer Specification-Basic Voice Services," AT&T 5ESS®

[57] ABSTRACT

An improved call forwarding arrangement where forwarded calls receive different terminating treatment from non-forwarded calls, for example providing a readily detectable, distinctive alerting signal for forwarded calls or completing only forwarded calls to a station and denying or forwarding other calls without requiring any customer involvement. The arrangement provides an improved call forwarding service for customers with advanced station display capabilities and, in addition, allows selective answering of only forwarded calls by customers that have conventional, analog station equipment. Both switch-based and station-based implements are disclosed.

5 Claims, 5 Drawing Sheets

CALL FORWARDING ARRANGEMENT

TECHNICAL FIELD

This invention relates to telecommunication call processing.

BACKGROUND AND PROBLEM

As stored program-controlled switching systems have evolved, a wide variety of useful features have been developed to extend the communication capabilities such systems provide. Call forwarding, a feature that allows a customer to receive calls at another location, is particularly popular among business customers who, in a dynamic work environment, are very often on the move in their day-to-day activities. However, consider a customer who is working for a few hours or days at a colleague's desk and has his calls forwarded to the colleague's directory number. The customer may be seriously inconvenienced by receiving, in addition to his own forwarded calls, many other calls that are intended for his colleague. Since answering such calls frequently results in being asked to take messages or provide information, the customer is forced to choose between interrupting his own work or refusing the requests and very likely offending a calling party. The problem is alleviated with the customer station display capabilities described in the AT&T 5ESS ™ Switch ISDN Basic Rate Interface Specification (5E4 Generic Program), where, in addition to a ringing signal to alert a customer to incoming calls, a call type is displayed that identifies calls that have been forwarded from another station. An observant customer can determine the call type by glancing at the display and selectively answer only forwarded calls. However, modification of the normal human response of answering a ringing telephone is difficult, particularly for customers that use call forwarding only infrequently. In addition, a large majority of customer stations do not have advanced display capabilities.

In view of the foregoing, a recognized problem in the art is the substantial communication station cost and relatively high degree of human involvement necessary to control the answering of only forwarded calls by reading a call type on an advanced station display.

SOLUTION

The foregoing problem is solved and a technical advance is achieved in accordance with the principles of the invention in an improved call forwarding arrangement where forwarded calls receive different terminating treatment from non-forwarded calls, for example providing a readily detectable, distinctive alerting signal for forwarded calls or completing only forwarded calls to a station and denying or forwarding other calls to another station without requiring any customer involvement. Although the arrangement provides an improved call forwarding service for customers with advanced station display capabilities, more importantly, it solves the problem of selective answering of only forwarded calls for the many customers that have conventional, analog station equipment.

A call to a communication station is processed in accordance with a method of the invention by first determining whether the call is a forwarded call. If it is determined that the call is a forwarded call, an alerting signal is generated that is distinctive from an alerting signal for a non-forwarded call. Alternatively, only forwarded calls are completed to the station, with or without distinctive alerting, and non-forwarded calls are denied or forwarded to another communication station, e.g., a message center.

In an illustrative embodiment described herein, the call processing is performed by a switch connected via a line to the communication station. The switch effects the generation of the distinctive alerting signal by first determining whether the station is an ISDN station. If the station is found to be an ISDN station, the switch transmits a message on the line to the station defining the distinctive alerting signal. In addition, if the ISDN station has display capability, a display is generated defining the call as a forwarded call and also defining the calling and redirecting numbers. If the station is not an ISDN station, the switch applies a power ringing signal to the line distinctive from a power ringing signal for a non-forwarded call.

To determine whether a call that is incoming from a second switch is a forwarded call, the first switch checks a message received from the second switch to determine whether a redirecting number is present. Such redirecting number is conventionally included in inter-switch call forwarding messages.

In a second illustrative embodiment, the call processing to effect call forwarding is performed by the forwarding communication station rather than the switch.

In a related, improved call forwarding arrangement, referred to herein as DN-specific call forwarding, only calls from a first directory number and/or to a second directory number are forwarded. Using the DN-specific call forwarding feature, a set of people that move among a set of communication stations receive only calls to their own directory numbers.

DETAILED DESCRIPTION

The principles of the present invention are described in the context of an integrated services digital network (ISDN) switch 1000 (FIG. 1), although it is important to note that the invention is applicable to conventional analog stored program-controlled switching systems as well. An integrated services digital network is defined as a network evolved from the telephony integrated digital network that provides end-to-end digital connectivity to support a wide range of services, including voice and non-voice services, to which users have access by a limited set of standard multipurpose customer interfaces. One example of ISDN switch 1000 is the integrated packet switching and circuit switching system disclosed in U.S. Pat. No. 4,592,048 issued to M. W. Beckner et al. on May 27, 1986. Switch 1000 includes a switching network 1010, which represents, in the above-referenced exemplary integrated packet switching and circuit switching system, a plurality of time-slot interchange units and a time-multiplexed switch to provide circuit-switched connections, and a plurality of packet switching units (interconnected via the time-slot interchange units and time-multiplexed switch) to provide packet-switched connections. Switch 1000 further includes a control arrangement 1020 which represents the control portion of the above-referenced exemplary switching system, including a central control and a plurality of control units that intercommunicate via predetermined channels of the time-multiplexed switch and a control distribution unit. For simplicity, the distributed control, multiple processor control arrangement 1020 is represented in FIG. 1 as a single processor 1021 and associated memory 1022.

Figure 1:
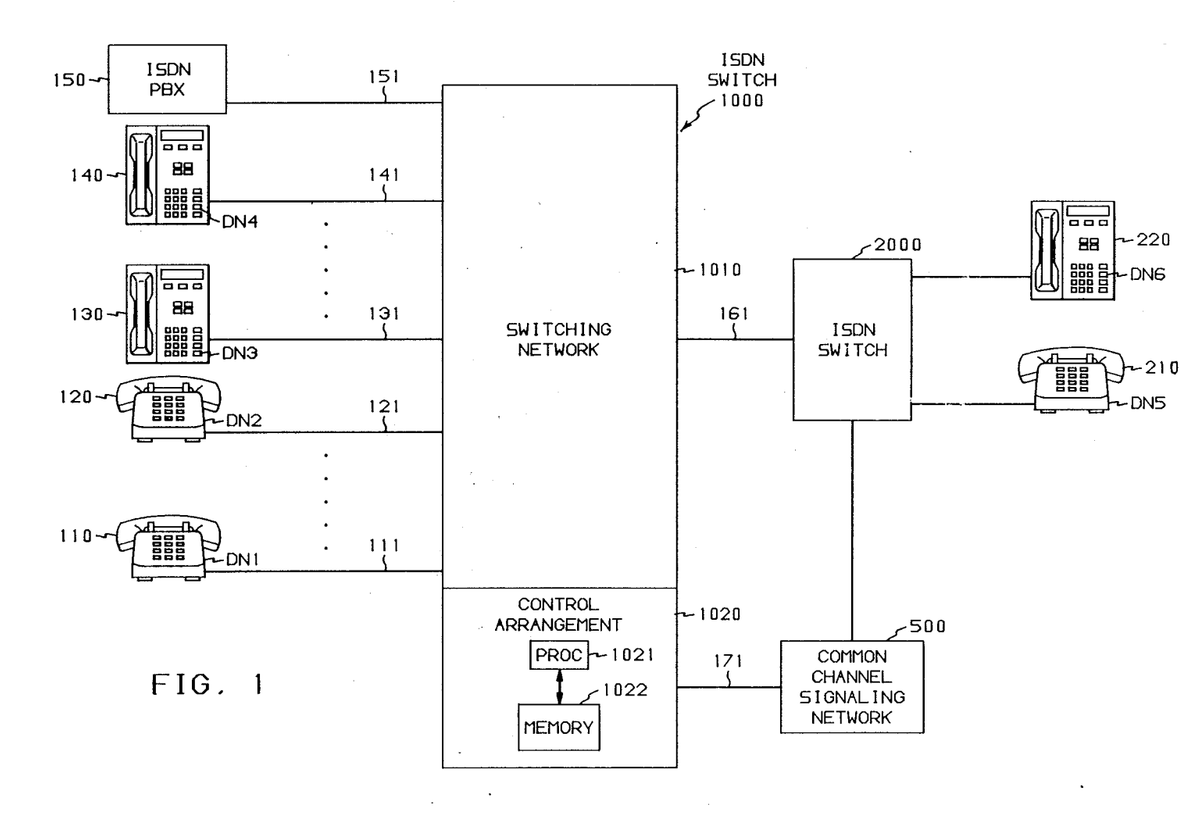
FIG. 1 is a diagram of a communication equipment configuration implementing an illustrative call forwarding arrangement in accordance with the present invention.

Also shown in FIG. 1 are two ISDN user stations 130 and 140, connected to switch 1000 via associated user access lines (digital subscriber lines) 131 and 141, and two conventional analog stations 110 and 120, connected to switch 1000 via analog lines 111 and 121. Although only two ISDN stations and two analog stations are explicitly shown, it is to be understood that switch 1000 interconnects a larger plurality of ISDN and analog stations.

Each ISDN station, e.g., 130, transmits information to and receives information from switch 1000, over what is referred to as a basic rate interface, in two 64 kilobits per second channels referred to as B-channels and in one 16 kilobits per second channel referred to as a D-channel. In the present embodiment, one B-channel is used to convey digitized voice samples at the rate of 8000, eight-bit samples per second and the other B-channel is used to convey data at a rate of 64 kilobits per second. (However, each B-channel could be used for either voice or data traffic.) Each B-channel is separately circuit-switched by switching network 1010 to other station equipment (either ISDN or analog). The D-channel is used both to convey signaling packets to effect message signaling between ISDN user stations and control arrangement 1020, and to convey data packets between different ISDN user stations. The D-channel is packet-switched by switching network 1010 either to other ISDN user stations, or to control arrangement 1020 which controls the establishment of both circuit-switched and packet switched calls within switch 1000.

In the present exemplary embodiment, information is conveyed between an ISDN user station, e.g., 130, and switch 1000 via a four-wire, user access line 131 using one pair of wires for each direction of transmission. User access line 131 transmits a serial bit stream at the rate of 192 kilobits per second which comprises 144 kilobits per second for the above-mentioned two 64 kilobits per second B-channels and one 16 kilobits per second D-channel and which further comprises 48 kilobits per second used for a number of functions including framing, DC balancing, control and maintenance. User access line 131 represents what is referred to by the International Telegraph and Telephone Consultative Committee (CCITT) as the T-interface. The use of the T-interface is only exemplary, however, as the invention is equally applicable to systems using other access methods.

Signaling packets are conveyed between the ISDN user stations and control arrangement 1020 enclosed in level 2 (link-level) frames in accordance, for example, with the standard LAPD protocol. The exemplary signaling messages used for the control of circuit-switched voice calls are in accordance with CCITT Recommendation Q.931.

Signaling between analog stations 110 and 120 and switch 1000 is performed using well-known stimulus signaling methods, for example the detection of dial pulses and on-hook/off-hook station states and the transmission of power ringing signals to the stations.

Switch 1000 is also connected via a 1.544 megabits per second digital transmission facility 151 to an ISDN private branch exchange (PBX) 150. Facility 151 implements what is referred to as a primary rate interface comprising twenty three, 64 kilobits per second B-channels and a single 64 kilobits per second D-channel. Switch 1000 is also connected via digital transmission facility 161 to an ISDN switch 2000. Signaling for calls between switches 2000 and 1000 is effected out-of-band via a common channel signaling network 500, for example a CCS7 network, and a signaling link 171. In the present example, switch 2000 is a local switch and is connected to a plurality of analog and ISDN stations, with analog station 210 and ISDN station 220 being specifically shown in FIG. 1. However, switch 2000 could also be a tandem or toll switch. Further, the connection between switches 1000 and 2000 could be implemented as a primary rate interface.

Figure 2:
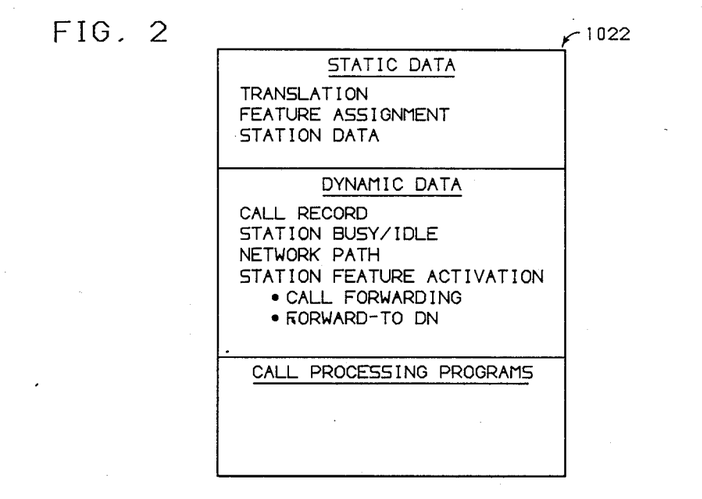
FIG. 2 is a diagram of memory facilities included in an ISDN switch in the configuration of FIG. 1.
Figure 3:
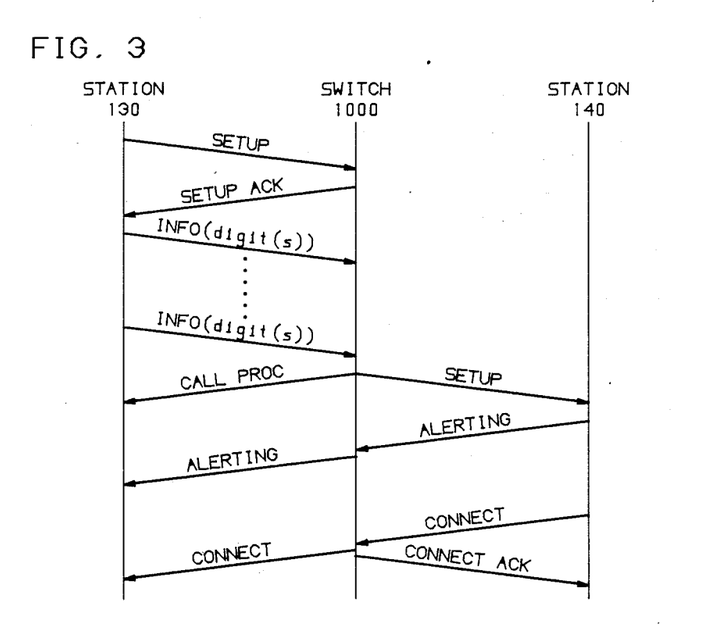
FIG. 3 is a message sequence diagram for a call between two ISDN stations in the configuration of FIG. 1.

The message signaling used for the establishment of a typical voice call between two ISDN user stations is illustrated by the following example. A user at station 130 goes off-hook by lifting the handset. Station 130 transmits a SETUP message (FIG. 3) to switch 1000. The SETUP messagae includes a call reference (CR) selected by station 130. The selected CR is included in all subsequent signaling messages between terminal 130 and switch 1000 concerning the particular call. Control arrangement 1020 of switch 1000 includes memory 1022 (FIG. 2) for storing both static and dynamic data needed for processing calls as well as a number of call processing programs. Control arrangement 1020 stores the received CR in a call record stored in a data table or relation in the dynamic data section of memory 1022. Switch 1000 then returns a SETUP ACK message (FIG. 3) to station 130. The user at station 130 then enters via a keypad the destination directory number, for example DN4, and station 130 transmits a sequence of INFO messages each including one or more digits of the directory number. (Alternatively, all of the directory number digits may be included in the SETUP message.) Switch 1000 uses the receive directory number as a key to translation data stored in memory 1022 and determines the identity of the terminating line 141 for the call. Switch 1000 selects a CR for use in identifying the call in the signaling messages to be conveyed between switch 1000 and station 140 and stores the selected CR in the call record of memory 1022. (Note that the CRs used for control communication with the originating and terminating stations are in general different.) Switch 1000 also reads network 1010 path data stored in memory 1022 and, if a network 1010 path is available to be assigned to the call, switch 1000 transmits a SETUP message informing station 140 of the incoming call. The SETUP message includes calling party identitiy information, e.g., a directory number DN3 assigned to station 130 or, alternatively the name of the calling party if such information is available to switch 1000. Station 140 visually displays such calling party identity information. Switch 1000 also returns a CALL PROC message to station 130 indicating that a call is being set up in response to the received directory number. In response to the SETUP message, station 140 enters an alerting state and begins ringing. Station 140 then returns an ALERTING message to switch 1000, which message is also conveyed back to originating station 130. Subsequently when the handset is lifted to answer the call, station 140 transmits a CONNECT message to switch 1000, which effects the completion of the assigned network 1010 path and then transmits the CONNECT message on to station 130. Switch 1000 also returns a CONNECT ACK message to station 140. The two parties can now communicate.

Figure 4:
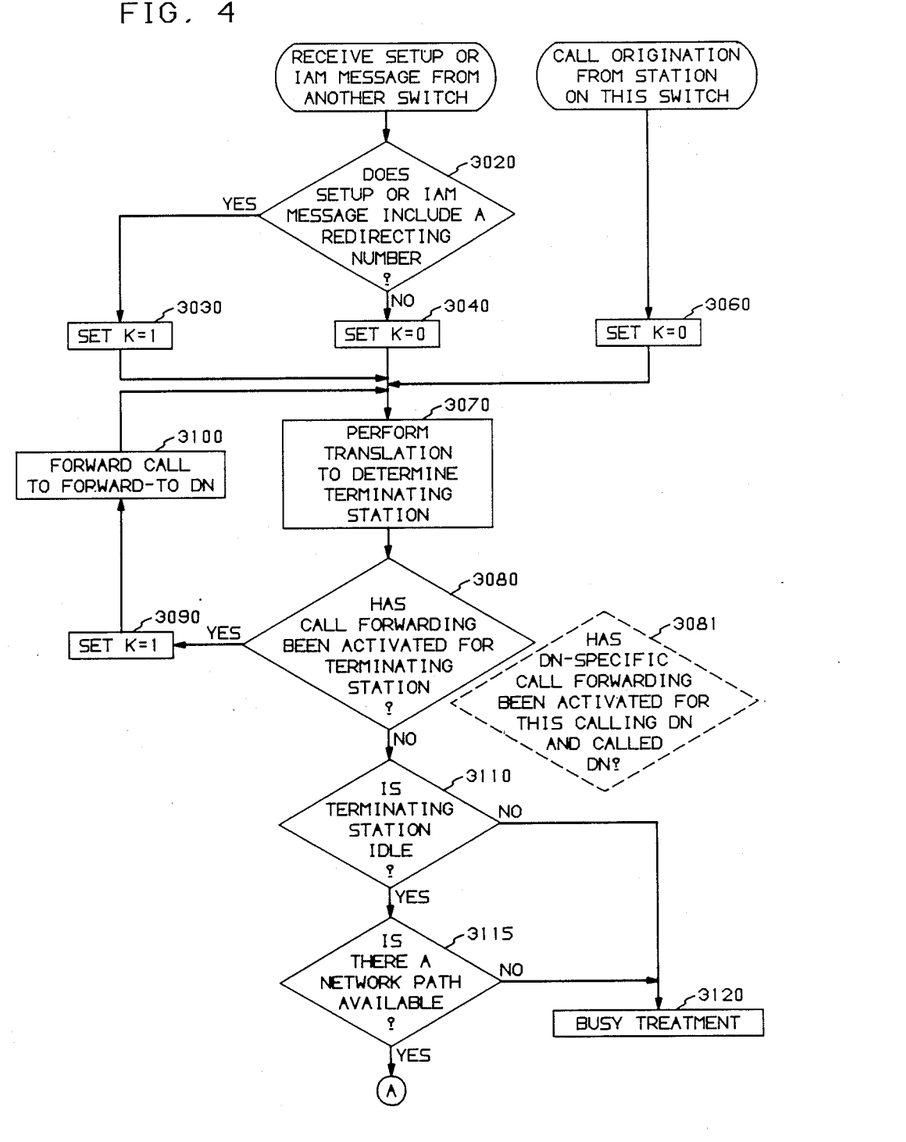
FIGS. 4 and 5 comprise a flow chart of a call processing program used to effect call forwarding in the configuration of FIG. 1.
Figure 5:
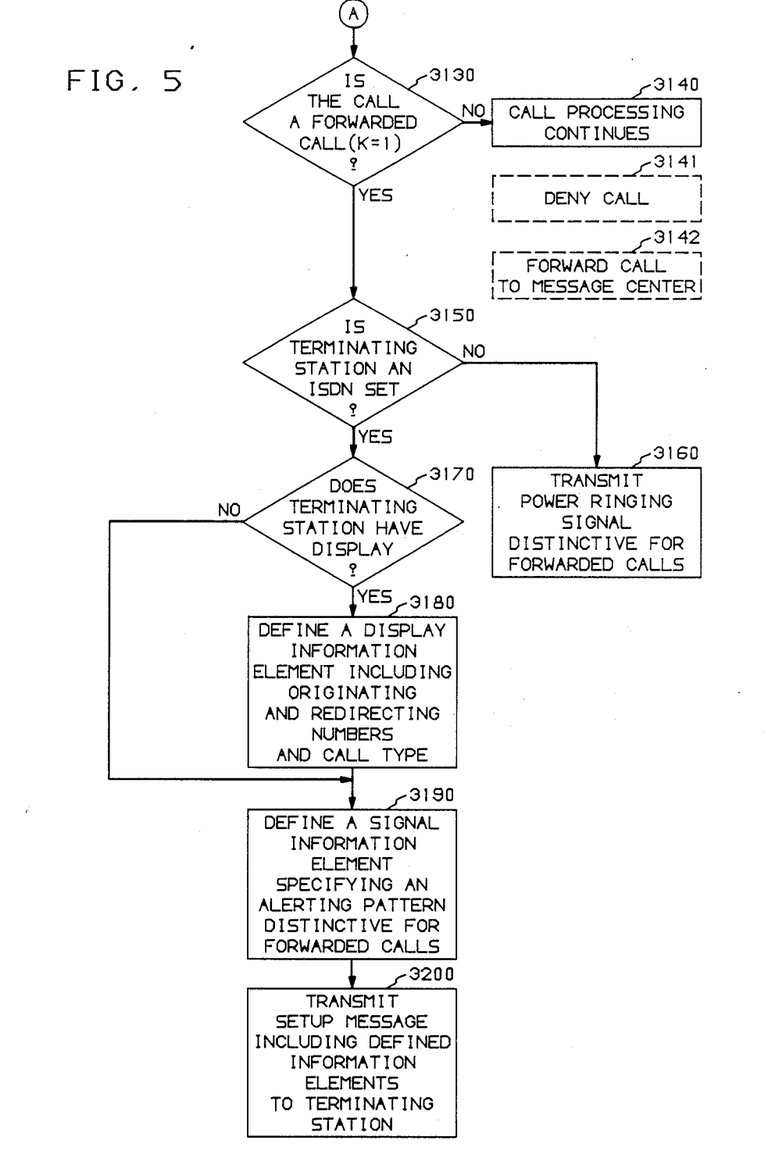

A flow chart for a call processing program stored in memory 1022 and executed by processor 1021 to implement an exemplary, improved call forwarding arrangement in accordance with the invention is shown in FIGS. 4 and 5. Execution of the program is initiated either in response to a call origination from a station (analog or ISDN) on switch 1000, or to receipt of a message from another switch concerning an incoming inter-switch call. Examples of a message for an incoming inter-switch call include a SETUP message from PBX 150, or an initial address message (IAM) from network 500 concerning a call from switch 2000. Execution begins in response to a SETUP or IAM message with decision block 3020, where the SETUP or IAM message is checked to determine whether a redirecting number information element (or a redirecting number parameter) is present indicating that the incoming call has been previously forwarded. If a redirecting number is present, execution proceeds to block 3030 where the value of a variable k is set to one. The variable k defines whether a call is a forwarded ($k=1$) or non-forwarded ($k=0$) call. If the check performed in block 3020 indicates that no redirecting number is present, execution proceeds from block 3020 to block 3040, and the value of the variable k is set to zero. Program execution begins in response to a call origination from a station on switch 1000 with block 3060, where the value of the variable k is set to zero. Execution proceeds from any one of the blocks 3030, 3040 or 3060 to block 3070, where the translation data stored in memory 1022 is read to determine the terminating station for the call. Once the terminating station has been determined, execution proceeds to decision block 3080, where the station feature activation data stored in memory 1022 is read to determine whether the call forwarding feature has been activated for the terminating station. If call forwarding has been activated, execution proceeds from block 3080 to block 3090, where the value of the variable k is set to one, and then to block 3100, where the forwarding of the call to the forward-to DN defined in memory 1022 is initiated. Execution is returned to block 3070 where the forward-to DN is translated and processing of the call continues.

If the check made in block 3080 indicates the call forwarding has not been activated for the terminating station, execution proceeds from block 3080 to block 3110, where the station busy/idle data stored in memory 1022 is read to determine whether the terminating station is idle. If the terminating station is found to be busy, execution proceeds to block 3120 where busy treatment is provided. However, if the terminating station is found to be idle, execution proceeds from block 3110 to block 3115, where the network path data stored in memory 1022 is read to determine whether there is a network path available for the call. If no network path is available, execution proceeds to block 3120, where busy treatment is provided. If an available network path is found, execution proceeds from block 3115 to block 3130, where a determination is made of whether the call being processed is a forwarded call or a non-forwarded call. The determination is based on the value of the variable k. If the determination in block 3130 indicates that the call is a non-forwarded call ($k=0$), execution proceeds from block 3130 to block 3140, and call processing continues to complete the call to the terminating station. However, if the determination made in block 3130 indicates that the call is a forwarded call ($k=0$), execution proceeds from block 3130 to block 3150, where the station data stored in memory 1022 is read to determine whether the terminating station is an ISDN set. If the station data indicate that the terminating station is not an ISDN set, execution proceeds from block 3150 to block 3160. In block 3160, control arrangement 1020 effects the transmission by switching network 1010 of a power ringing a signal distinctive for a forwarded call.

Returning to block 3150, if it is determined that the terminating station is an ISDN set, execution proceeds to decision block 3170 where the station data stored in memory 1022 is read to determine whether the terminating station has a display. If the terminating station has a display, execution proceeds from block 3170 to block 3180, where a display information element is defined. The display information element includes the originating and redirecting numbers for the forwarded call, as well as a call type defining the call as a forwarded call. After the display information element has been defined, execution proceeds to block 3190, where a signal information element is defined specifying an alerting pattern that is distinctive for forwarded calls. Block k3190 is also executed and a signal information element is defined after a determination in decision block 3170 that the terminating station does not have a display. Execution proceeds from block 3190 to block 3200, where a SETUP message is transmitted to the terminating station. The SETUP message includes the defined signal information element and, for stations having a display, the defined display information element. The terminating station generates a distinctive ringing signal in response to the received signal information element.

Although in most cases, an audible ringing signal is used to alert a customer to the presence of an incoming call, other alerting signals, including flashing lamps or displays or ringing bells are contemplated. As used herein, the term alerting signal refers to any signal used to attract the attention of a customer to an incoming call at a communication station. The term does not refer to a conventional character display defining an incoming call type.

The operation of the improved call forwarding program of FIGS. 4 and 5 is illustrated herein by two call processing examples. For the first example, assume that a user at analog station 110 dials the directory number DN4 associated with ISDN station 140 and that a user at station 140 has activated call forwarding to the forward-to DN, DN3, associated with ISDN station 130. Execution of the program beings with block 3060 (FIG. 4), where the value of the variable k is set to zero. In block 3070, the dialed directory number DN4 is translated to determine the terminating station 140. The check performed in block 3080 indicates, however, that call forwarding has been activated for station 140. The value of the variable k is set to one in block 3090 and call forwarding to the forward-to DN, DN3, is initiated in block 3100. A translation of DN3 in block 3070 determines that the new terminating station for the call is station 130. Assuming that call forwarding has not also been activated for station 130, execution proceeds from block 3080 to block 3110 and, further assuming that station 130 is idle and that is there is an available network 1010 path for the call, execution continues on through blocks 3110 and 3115 to block 3130. Since the variable k has a value of one indicating that the call is a forwarded call, execution proceeds from block 3130 to block 3150. A reading of the station data for station 130 indicates that station 130 is an ISDN station having a display. Accordingly, execution proceeds from block 3150 to block 3170 and on to block 3180. In block 3180, a display information element is defined including the originating number, DN1, the redirecting number, DN4, and a call type defining the call as a forwarded call. In block 3190, a signal information element is defined specifying an alerting pattern that is distinctive for forwarded calls, for example continuous ringing for forwarded calls in contrast with on/off ringing cycles for non-forwarded calls, or one ringing cycle for forwarded calls and another for non-forwarded calls. In block 3200, a SETUP message including the defined display and signal information elements is transmitted to station 130. Station 130 responds by generating the distinctive alerting signal for forwarded calls as well as the defined display.

For the second example, assume that a user at ISDN station 220 enters the directory number DN5 associated with analog station 210 and that a user at station 210 has activated calll forwarding to the forward-to DN, DN2, associated with analog station 120. Switch 2000 determines that the call is to be forwarded to switch 1000 and effects the transmission of an IAM message, defining the originating number DN6 and the redirecting number DN5, via network 500 and link 171 to control arrangement 1020 of switch 1000. In response to the IAM message, execution of the program of FIGS. 4 and 5 begins withblock 3020 where the IAM message is checked to determine whether a redirecting number is present. Since the redirecting number DN5 is found, execution proceeds to block 3030 and the value of the variable k is set to one. A translation of the forward-to DN, DN2, in block 3070 determines that the new terminating station for the call is station 120. Assuming that call forwarding has not also been activated for station 120, execution proceeds from block 3080 to block 3110 and, further assuming that station 120 is idle and that there is a network 1010 path available for the call, execution continues on to block 3130. Since the variable k has a value of one indicating that the call is a forwarded ccall, execution proceeds from block 3130 to block 3150. A reading of the station data for station 120 indicates that station 120 is not an ISDN station. Accordingly, execution proceeds from block 3150 to block 3160 and network 1010 transmits to station 120 and power ringing signal that is distinctive for forwarded calls.

Several alternative program blocks are indicated by dashed lines in FIGS. 4 and 5. Rather than continuing to process non-forwarded calls as in block 3140, all non-forwarded calls could instead be denied (block 3141). Alternatively, all non-forwarded calls could in turn be forwarded to a message center (block 3142), for example, at station 140. In either case, a user working at a colleague's desk and having the user's calls forwarded to the colleague's directory number is freed from the interruption and inconvenience of receiving the colleague's calls.

A related alternative is to modify the call forwarding feature such that only calls from a first directory number and/or to a second directory number are forwarded. This feature, referred to herein as DN-specific call forwarding, is implemented using the alternative program block 3081 rather than block 3080. Using a DN-specific call forwarding feature, a large set of people can move among a corresponding set of stations and are still able to receive only calls to their own DNs. For example, suppose that the user normally at station 140 moves to station 110 and the user normally at station 110 moves to station 120. DN-specific call forwarding is activated at station 140 such that only calls having a called DN of DN4 are forwarded to DN1. DN-specific call forwarding is activated at station 110 such that only calls having a called DN of DN1 are forwarded to DN2. Thus the user who has moved to station 110 will receive all calls having a called DN of DN4, and the user who has moved to station 120 will receive all calls having a called DN of DN1.

Figure 6:
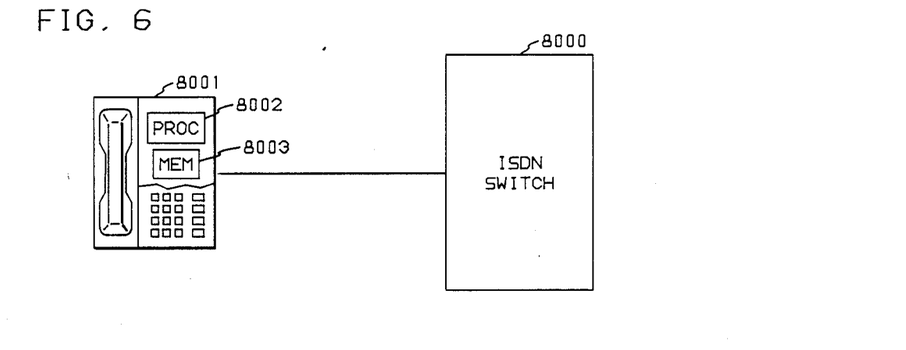
FIG. 6 is a diagram of an illustrative station-based implementation of a call forwarding arrangement in accordance with the invention.
Figure 7:
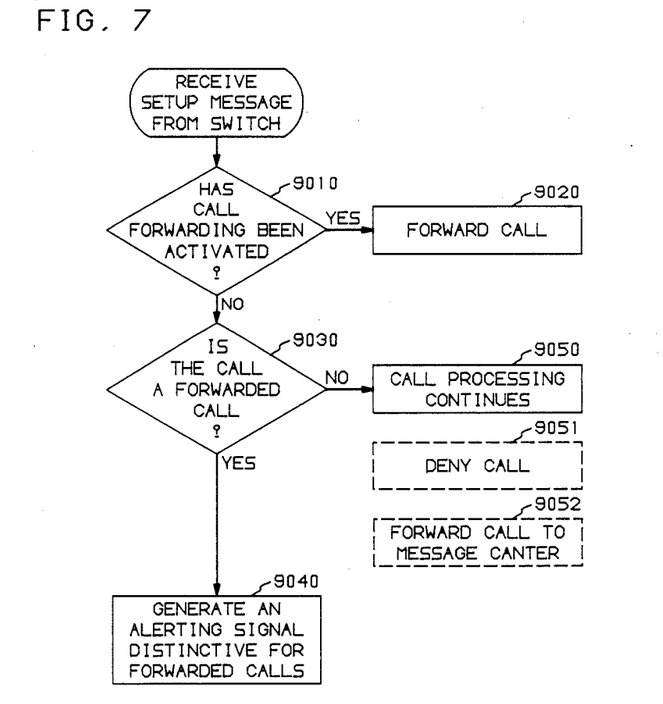
FIG. 7 is a flow chart of a call processing program used for call forwarding in the station-based implementation of FIG. 6.

Rather than implementing the improved call forwarding arrangements in the switch, such arrangements may also be implemented in the communication station. A configuration including an ISDN switch 8000 and a communication station 8001 including a processor 8002 and associated memory 8003 is shown in FIG. 6. A flow chart for a call processing program stored in memory 8003 and executed by processor 8002 to implement a station-based call forwarding arrangement in accordance with the invention is shown in FIG. 7. Program execution begins in response to receipt by station 8001 of a SETUP message for an incoming call from switch 8000. In decision block 9010, a check is made to determine whether call forwarding has been activated for station 8001. If the check indicates that call forwarding has been activated, execution proceeds from block 9010 to block 9020 and the call is forwarded by appropriate message signaling from station 8001 to switch 8000. If the check made in block 9010 indicates that call forwarding has not been activated, execution proceeds from block 9010 to decision block 9030. In block 9030, the received SETUP message is inspected to determine whether the incoming call is a forwarded call. In the station-based call forwarding arrangement, the SETUP messages transmitted to station 8001 for forwarded calls include a redirecting number information element. If the received SETUP message does not include a redirecting number information element, the call is a non-forwarded call, execution proceeds from block 9030 to block 9050 and call processing continues to complete the call to station 8001. If the received SETUP message does include a redirecting number information element, the call is a forwarded call and execution proceeds from block 9030 to block 9040. In block 9040, processor 8002 controls the generation of an alerting signal distinctive for forwarded calls.

Rather than continuing processing of non-forwarded calls, such calls may be denied (block 9051) or forwarded (block 9052) to another communication station, e.g., a message center.

It is to be understood that the above-described call forwarding arrangements are merely illustrative of the principles of the present invention and that many variations may be devised by those skilled in the art without departing from the spirit and scope of the invention. It is therefore intended that such variations be included within the scope of the claims.

What is claimed is

1. A call processing method comprising
   determining whether a call to a communication station is a forwarded call and
   completing said call to said station only in response to a determination that said call is a forwarded call
   wherein said station is connected to a switch and wherein said method is performed by said station.

2. A method in accordance with claim 1 further comprising
   in response to a determination that said call is a non-forwarded call, forwarding said call to another communication station.

3. A method in accordance with claim 1 further comprising
   in response to a determination that said call is a non-forwarded call, denying said call.

4. A method in accordance with claim 1 further comprising
   in response to said determination that said call is a forwarded call, effecting generation of an alerting signal distinctive from an alerting signal for a non-forwarded call.

5. A method of processing a call to a communication station comprising
   determining whether said call is a forwarded call;
   in response to a determination that said call is a forwarded call, performing at least one of the following steps (A) and (B): (A) effecting generation of an altering signal distinctive from an alerting signal for a non-forwarded call, and (B) completing said call to said station; and
   in response to a determination that said call is a non-forwarded call, performing one of the following steps (C) and (D): (C) denying said call, and (D) forwarding said call to another communication station
   wherein said first-mentioned station is connected to a switch and wherein said method is performed by said first-mentioned station.

* * * * *